US006848841B2

(12) United States Patent
Cochran et al.

(10) Patent No.: US 6,848,841 B2
(45) Date of Patent: Feb. 1, 2005

(54) OPTICAL COMPONENT CONNECTOR

(75) Inventors: Robert A. Cochran, Roseville, CA (US); David A. Robinson, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 10/237,475

(22) Filed: Sep. 9, 2002

(65) Prior Publication Data
US 2004/0047569 A1 Mar. 11, 2004

(51) Int. Cl.[7] .............................. G02B 6/28; G02B 6/42
(52) U.S. Cl. ............................ 385/88; 385/24; 385/14
(58) Field of Search ....................... 385/14, 24, 88–94, 385/129–132, 15, 16, 18, 31, 39, 42

(56) References Cited

U.S. PATENT DOCUMENTS

| 5,488,682 A | 1/1996 | Sauter et al. |
| 5,726,788 A | 3/1998 | Fee et al. |
| 5,896,473 A | 4/1999 | Kaspari |
| 5,937,133 A | 8/1999 | Moss et al. |
| 5,980,312 A | 11/1999 | Chapman et al. |
| 6,172,778 B1 | 1/2001 | Reinhorn et al. |
| 6,233,376 B1 | 5/2001 | Updegrove |
| 6,290,400 B1 | 9/2001 | Emberty et al. |
| 6,318,903 B1 | 11/2001 | Andrews et al. |
| 6,379,053 B1 | 4/2002 | van Doorn |
| 6,402,393 B1 | 6/2002 | Grimes et al. |
| 6,661,940 B2 * | 12/2003 | Kim .............................. 385/15 |

* cited by examiner

Primary Examiner—Akm Enayet Ullah
Assistant Examiner—Kevin S. Wood

(57) ABSTRACT

A system and method for interconnecting electronic components for facilitating shared communication. The system comprises a translucent optical layer, a plurality of access slots in the translucent optical layer providing access thereto, and at least one electronic component having an optical communicator, and an optical interface connector. The optical interface connector is complementarily matched to at least one of the plurality of access slots. The optical communicator accesses the translucent optical layer when the at least one electronic component is inserted into at least one of the plurality of access slots.

22 Claims, 5 Drawing Sheets

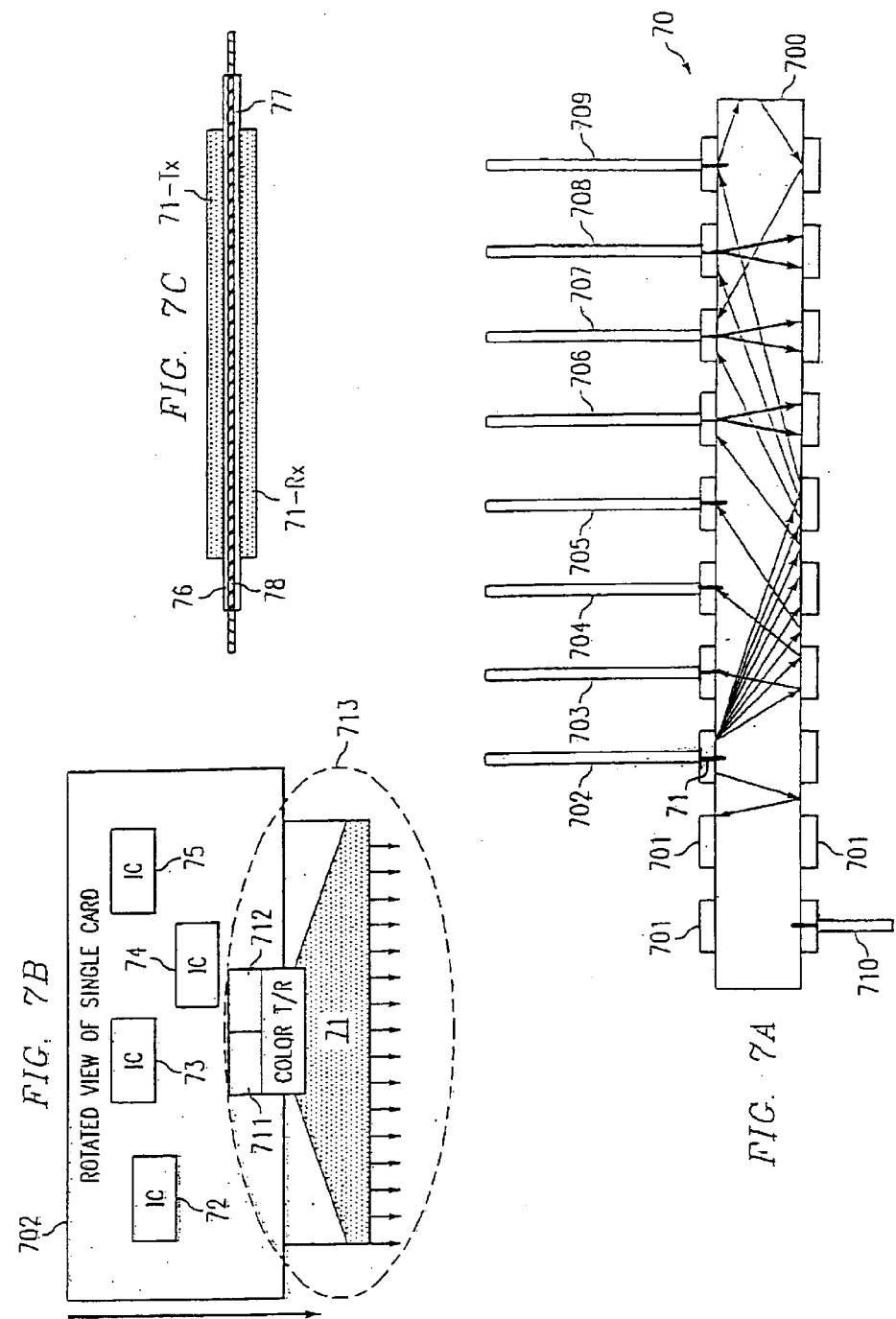

OPTICAL COMPONENT CONNECTOR

BACKGROUND

Many electronic or computerized devices and equipment, regardless of size, are a managed interconnection of many different subsystems. Such electronic computing equipment (e.g. disk arrays, computers, routers, switches) utilize a shared copper conductor crossbar switch or bus backplane for interconnecting the subsystem components (e.g. processors, cache, shared memory, disk controllers, host interface cards). Although the copper crossbar switch provides a substantial advance in throughput ability, it typically has limitations regarding expandability, reliability, and the ability to multicast or eavesdrop between the subsystems. A typical copper crossbar or bus backplane may allow approximately 4–8 simultaneous and separate data paths.

Computing systems and peripherals typically consist of several cards or blades plugged into a chassis. These cards are generally interconnected by a common backplane, which is typically copper, and/or a small number of shared buses. The sharing of busses has typically been an architectural bottleneck that has limited the maximum throughput of the computer or peripheral. Because the busses are shared, any particular conversation or communication between two interconnected components, such as between a disk director and a channel processor, for example, must wait its turn. This connection method architecturally limits the amount of data that can be moved by the computing device.

In order to improve on the limitations of shared busses, crossbar switches that increased the interconnectability and throughput for a backplane connection were developed. Crossbar switches are generally not limited in the same manner as the shared-bus architecture because a crossbar switch typically allows a certain number of separate data transmissions to take place simultaneously, without any one transmission interfering with (or holding off) another. For example, in an 8×8 crossbar switch, up to 8 separate data transmissions may take place simultaneously. This architecture allows a much higher total system throughput rate.

While shared busses and crossbar switches generally allow for multiple interconnections of multiple electronic computer sub-systems, there are problems and limitations with the current shared bus and crossbar switch technology. Because the interconnection paths of shared busses and crossbars are typically hard-wired, it is impractical, without substantial re-design and retrofitting or even total replacement, to expand the capacity of the bus or crossbar.

Current bus and crossbar technology does not typically allow for multicasting (i.e., communicating data to more than one receiving component and/or subsystem on the same transmission) or eavesdropping (i.e., one subsystem that taps into the data communication path between two other subsystems in order to perform some other function). Furthermore, crossbar switches are generally quite complex, which results in a high expense. This expense greatly increases when attempting to scale and/or expand the connectability and/or throughput of the backplane.

In such conventional, copper crossbar or backplane systems, the abundance of long, parallel copper wires (like antennae) may also create substantial Radio Frequency Interference (RFI). RFI may produce unwanted effects, such as: (1) adding expense in terms of the time/money to mitigate or alleviate the interference; (2) limiting how closely devices can be racked together; and (3) creating the potential for unwanted eavesdropping. Furthermore, RFI may pose a health risk because of the electromagnetic field generated by the RF signals.

BRIEF SUMMARY

Representative embodiments are directed to a system for interconnecting electronic components to facilitate shared communication comprising a translucent optical layer, a plurality of access slots in said translucent optical layer providing access thereto, and one or more electronic components having an optical communicator, and an optical interface connector. The optical interface connector is complementarily matched to at least one of the plurality of access slots, and the optical communicator accesses the translucent optical layer when the one or more electronic components is inserted into at least one of the plurality of access slots.

Additional representative embodiments are directed to a method for optically connecting electronic components comprising the steps of establishing an optical communication path, transmitting optical signals through the optical communication path from one or more components, the one or more components accessing the optical communication path through one or more access openings, and receiving optical signals transmitted through the optical communication path by the one or more components. The optical communication path comprises a translucent layer.

Additional representative embodiments are directed to an optical switch comprising means for providing an optical transmission medium common to one or more components, means for transmitting optical communication signals through the optical transmission medium from one or more system elements, the one or more system elements accessing the optical transmission medium through one or more access connectors, and means for receiving optical communication signals transmitted through the optical transmission medium by the one or more system elements. The optical transmission medium comprises a translucent optical layer.

BRIEF DESCRIPTION OF THE DRAWINGS

FIG. 7A is a cross-sectional view of an optical backplane/crossbar configured according to the teachings of one representative embodiment;

FIG. 7B is a close-up side-view of an embodiment of a plug-in card configured for optical communication and compatible with representative embodiments;

FIG. 7C is a close-up bottom-view of the plug-in card embodiment as shown in FIG. 7B;

DETAILED DESCRIPTION

Figure 1:
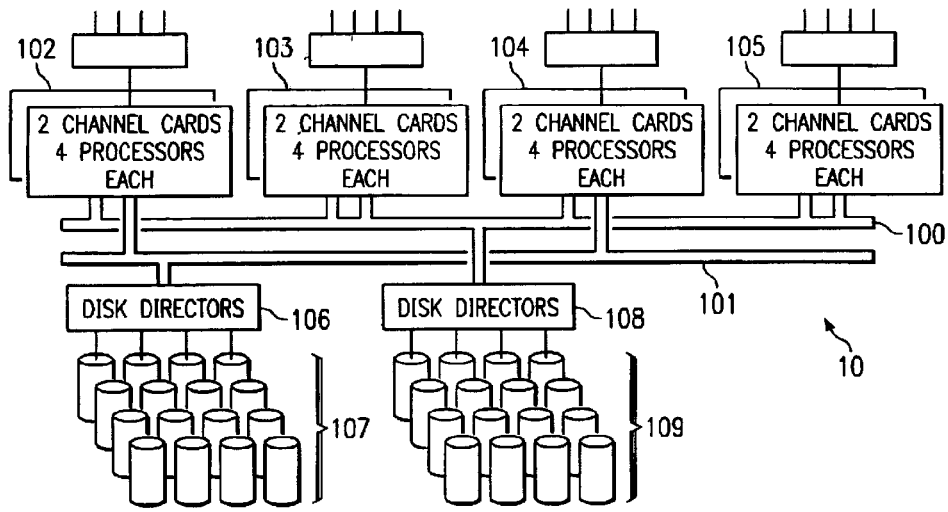
FIG. 1 is a high-level block diagram illustrating the interconnecting subsystems of a typical disk array using a shared bus architecture.

FIG. 1 is a high-level block diagram illustrating the interconnecting subsystems of a typical disk array using a shared-bus architecture. In shared-bus architecture 10, shared busses 100 and 101 are coupled to 2-channel cards 102–105 and disk directors 106 and 108, each connected to disk arrays 107 and 109. Disk director 108 is shown connected to bus 100 which is also connected to 2-channel cards 102–105. Disk director 106 is shown connected to bus 101 which is also connected to 2-channel cards 102 and 104. Under operation, if 2-channel card 104 needed to initiate a communication session with disk director 106, 2-channel card 102 would not be able to communicate with either disk director 106 or 108, until 2-channel card 104 is finished with its communication session. Furthermore, if shared-bus architecture 10 required the addition of another disk director with its own disk arrays, there would be no practical way to upgrade shared-bus architecture 10 because of the hardwiring required to fabricate the existing busses and connectors.

Figure 2:
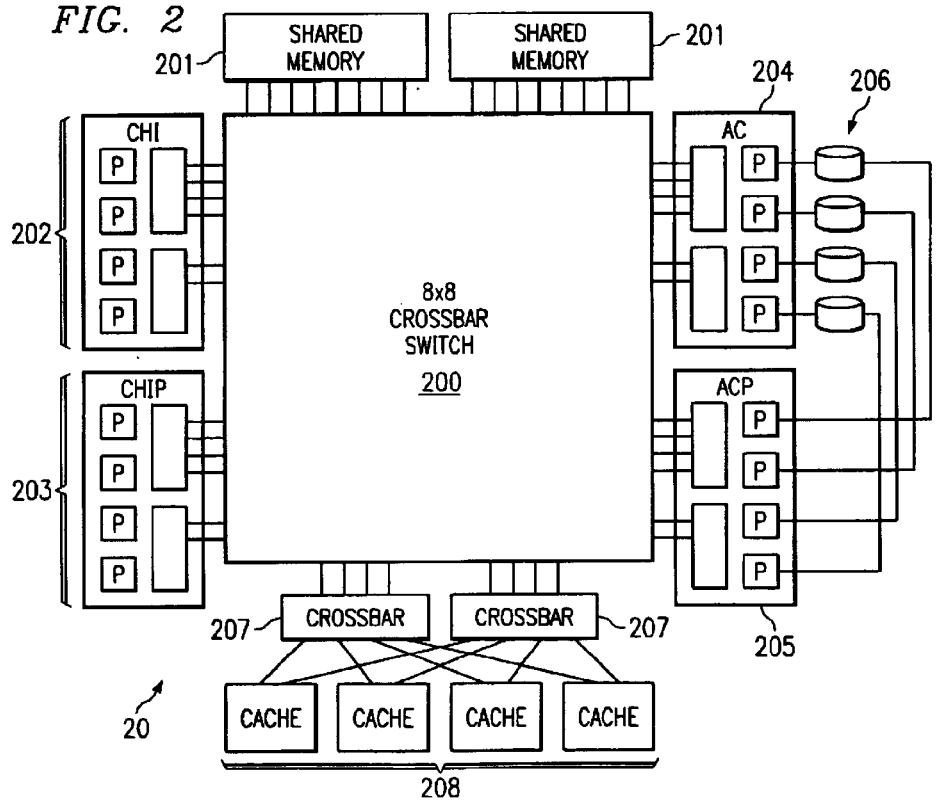
FIG. 2 is a top-level block diagram illustrating a typical 8×8 crossbar switch.

FIG. 2 is a high-level block diagram illustrating an 8×8 crossbar switch. Crossbar switch 200 provides a possible sixty-four electrical connections, with a limit of eight active simultaneous connections, between any of the components and/or subsystems of crossbar system 20. Crossbar system 20 includes shared memory 201, processor banks 202–205, disk array 206 (connected to processor bank 204), and crossbars 207, with connected caches 208. Crossbar switch 200 provides the interconnects for any of processor banks 202–205, shared memory 201, and crossbars 207 to communicate data between themselves.

Figure 3:
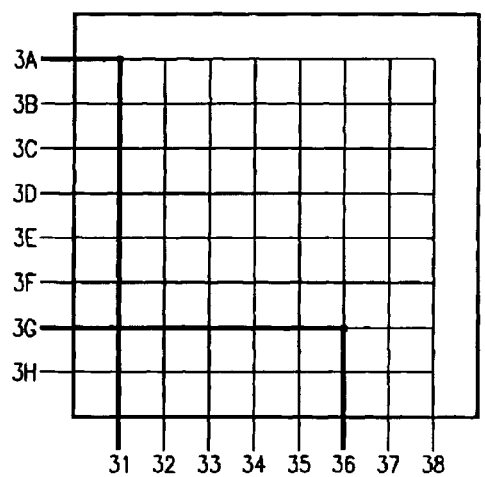
FIG. 3 is a logical connection diagram illustrating the logical connection possibilities of the crossbar switch of FIG. 2.

FIG. 3 is a logical connection diagram illustrating the logical connection possibilities of crossbar switch 200 (FIG. 2). Connection diagram 30 includes a graph of lines 3A–3H and lines 31–38 that representing multiple conductors for providing the connection paths between the different subsystems. As shown in FIG. 3, a module connected at conductor 3A is provided an electronic path with the module or subsystem connected at conductor 31. FIG. 3 also illustrates a module connected at conductor 3G is provided an electronic path with the module or subsystem connected at conductor 36. In a typical crossbar switch, each path is capable of transmitting approximately 100 MB/s. Therefore, 8×8 crossbar switch 200 would generally be capable of up to 800 MB/s of data transmission throughput.

Figure 4:
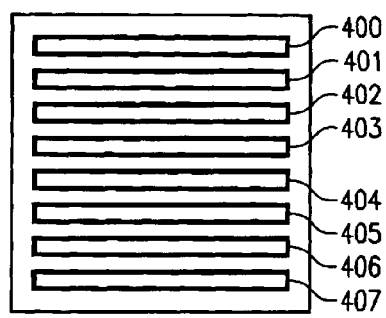
FIG. 4 is a physical illustration of the top view of a typical chassis backplane that facilitates plug-in cards.
Figure 5B:
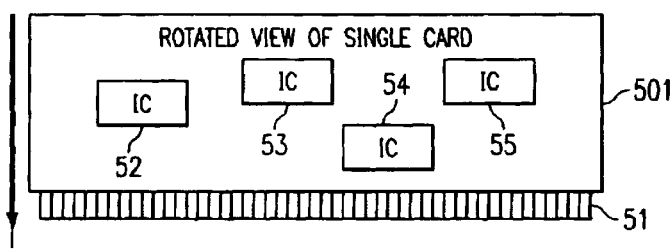
FIG. 5B is a rotated side view of a typical plug-in card having multiple integrated circuits formed thereon.
Figure 5A:
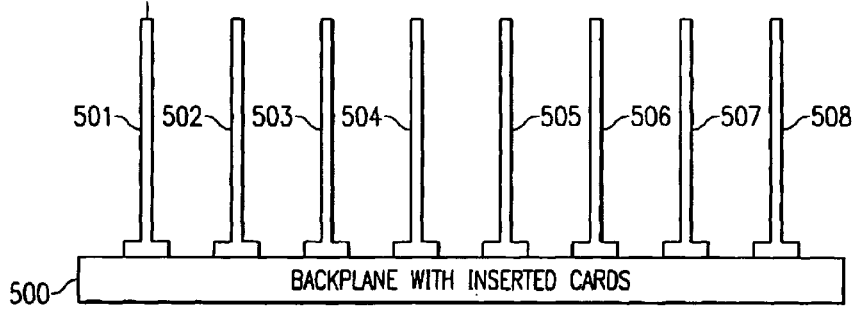
FIG. 5A is a side view of the typical chassis backplane, as shown in FIG. 4, that includes the inserted plug-in cards.

FIG. 4 is a physical illustration of the top view of a chassis backplane that facilitates plug-in cards. Chassis backplane 40 generally includes spring loaded copper fingers to make electrical connections in each of card slots 400–407. FIG. 5A is a side view of chassis backplane 40, shown in FIG. 4, that includes the inserted plug-in cards. Backplane 500 shows plug-in cards 501–508 inserted into card slots, such as card slots 400–407 shown on FIG. 4. FIG. 5B is a rotated side view of a plug-in card having multiple integrated circuits formed thereon. Plug-in card 501 includes integrated circuits 52–55, and connection strip 51 for providing an electrical connection to the spring-loaded copper fingers in one of card slots 400–407 (FIG. 4). It should be noted that one of the main problems with the plug-in card backplane method is the frailty of the spring-loaded copper fingers. Many difficulties may be caused when one or more of the spring-loaded copper fingers is inadvertently bent back. Without the connection, one or more of the components or subsystems on the plug-in card may not operate properly and may damage the system equipment.

Optical communication techniques have been in use for many years in the area of telecommunications and networking. The use of optically multiplexed fiber communications for long distance communication (e.g., 10 km–200 km) of telephones, computers, networks, disk arrays, and the like has become a common practice. Representative embodiments preferably provide for the use of optical multiplexing techniques, such as Dense Wavelength Division Multiplexing (DWDM), to facilitate interconnection and communication within computer systems, arrays, and the like, to replace the electrical copper backplane or crossbar with passive optics.

Figure 6:
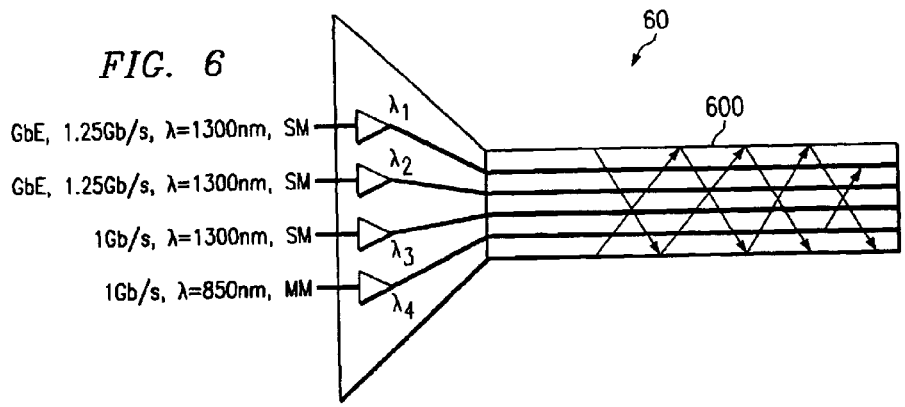
FIG. 6 is a block diagram illustrating the concept of DWDM used in fiber optic transmission.

The basic theory of DWDM is that many different light frequencies (colors) may share the same optical fiber at the same time without the worry of interference or cross-talk. For instance, it is possible to carry sixty-four or more separate data transmissions on a single glass fiber. FIG. 6 is a block diagram illustrating the concept of DWDM used in fiber optic transmission. DWDM system 60 is shown with fiber 600 carrying four different wavelengths of optically multiplexed data transmitted at high-speed. Multiplex signals $\lambda_1$–$\lambda_4$ are each a different color or wavelength. The different colors generally prevent interaction or cross-talk between the signals multiplexed onto each of multiplex signals $\lambda_1$–$\lambda_4$. Each input to the optical system may be either optical or electrical and is preferably converted through DWDM into a single light color and sent through fiber 600. At the receiving end, the desired color is isolated/separated through DWDM (by way of a prism or other such light sensitive device), and the signal is then returned to its original (optical or electrical) form.

FIG. 7A is a cross-sectional view of an optical backplane/crossbar configured according to the teachings of representative embodiments. Optical crossbar 70 preferably comprises a layer of a transparent or translucent optical material 700. Optical layer 700 has a plurality of access slots or openings 701 configured thereon facilitating connections with electronic components, such as plug-in cards 702–710. Optical layer 700 is common to each of cards 702–710. The cards are preferably connected to the backplane and, thus, optical layer 700 through optical interface connector 713. Optical layer 700 is preferably an optical transmission medium, such as glass, polymer, or the like, infused with an empirically optimized ratio/type of light diffusing particles and reflective or mirrored edges in order to enhance the optical transmission qualities. As the multiple optical communication signals travel within optical layer 700, plug-in cards 702–710 selectively receive and translate the specific signal/frequency intended for the specific plug-in card. The communicated data or information may then be used for these intended processing functions.

FIG. 7B is a close-up, side-view of an embodiment of plug-in card 702 configured for optical communication and which is compatible with representative embodiments. Plug-in card 702 preferably comprises an optical communicator, such as transmission/receiver unit 71, and any number of card components, such as integrated circuits 72–75, as shown. When inserted into optical layer 700 through slot 701 (as seen in FIG. 7A), transmission/receiver unit 71 preferably filters all transmission wavelengths except for the wavelength intended for receipt by plug-in card 702. It then translates the optical signal into the appropriate format, such as converting between optical and electronic signals through electrical-to-optical converter 711 and optical-to-electrical converter 712, for processing by the electronic components.

FIG. 7C is a close-up bottom-view of the plug-in card embodiment as shown in FIG. 7B. Plug-in card 702 preferably includes clear, stratified polymer light guides 76 and 77 for forming the optical connection with optical layer 700 (FIG. 7A). To prevent signal crossing, light guides 76 and 77 are divided by light barrier 78. For transmission of data, plug-in card 702 may include optical transmitter 71-TX, which may comprise any colored light transmitter, such as a liquid crystal display (LCD), laser-diode, or the like. It should be noted that optical transmitter 71-TX may also preferably include a DWDM multiplexer to convert the optical communication signals into the proper multiplexed form. The optical transmitter includes the flexibility to select, and stay with, a unique transmission color (e.g. red) that only it uses. For the receipt of data, plug-in card 702 may also include optical receiver 71-RX, which may comprise any colored light receiver, such as a charge coupled device (CCD), or the like. It should be noted that optical receiver 71-RX may also preferably include a DWDM demultiplexer to convert the DWDM received signals into the underlying optical communication signals for processing by the electronic component. The optical receiver includes the ability to receive/discriminate a selected, single color of light (e.g. green) out of many colors being simultaneously used within the optical crossbar backplane.

A periodic "heart beat" pulse of light from all cards may allow a new card to choose an unused light color. As with existing copper busses and crossbar switches, each optical card or sub-system component would preferably know how to register with the other cards and set up communication sessions with other cards, sub-systems, and/or processors. Furthermore, because of the optical interface, a plug-in card may preferably be added or removed, regardless of the on/off state of the entire system, without causing electrical glitches or spikes typically found when the power and/or ground pins of electrical plug-in cards are connected and/or disconnected.

Unlike the traditional copper bus backplanes or crossbar switches, which must be expensively pre-wired for little (if any) expandability, the optical connections described in this representative embodiment preferably allow for the easy addition of additional slots and plug-in cards. Therefore, next generation products may be developed or released much more often. Furthermore, because of the increased bandwidth capability of optical transmission technology, the total available and expandable bandwidth for this and other representative embodiments would preferably be very large. For example, whereas a typical copper bus architecture may be limited to less than 1 GB/s of total system throughout, and a copper crossbar switch may be limited to 2–4 GB/s, the optical approach of the various embodiments may preferably yield a much higher number. The maximum throughput may depend on the number of discrete light colors that can be simultaneously used (currently 64) and the throughput of each color (currently 200 Mbytes/s per color). Under the current optical transmission technologies, an optical crossbar backplane configured according to the teachings of representative embodiments may preferably be capable of approximately 200 MB/s×64 (12.8 GB/s), which is approximately four times the total system bandwidth of the current state of the art copper/metal crossbar switches. As optical technology improves, this difference will likely increase substantially.

One advantage of implementing an optical crossbar/bus backplane system as described in representative embodiments is the fact that the optical crossbar/backplane is a passive element needing no electricity or power for operation. This would advantageously reduce the entire power consumption requirements of any given system, in which one of the various systems implementing representative embodiments were operating.

Unlike a conventional copper crossbar switch which generally can only allow a point-to-point connection between sub-system components, the optical crossbar/backplane preferably allows for a multicast (i.e., one-to-many broadcast) connection that has the potential to preferably speed up some internal processes. Moreover, the optical crossbar/backplane would preferably allow for eavesdrop capability. For example, if card A were talking to card B, card C would preferably have the ability to tap into the data communication stream between cards A and B. In certain circumstances, the ability to eavesdrop may preferably speed up device response time.

In an example operation, a read-cache-miss, which is generally an attempted read of data on the cache that turns out is not on the cache, but will, instead require a read from another memory device, the current methods have the disk array making the following steps:

1. the host interface card queries the read cache for a particular disk sector;
2. if the read cache does not have that particular disk sector stored, it queries the disk drive for it;
3. the data is then transferred from the disk to the read cache;
4. the data is then further transferred from the read cache to the host interface card to complete the read-cache operation.

However, with the internal eavesdrop capability of the described representative embodiment, the sequence may preferably be shortened to the following steps:

1. the host interface card queries the read cache for a particular disk sector;
2. if the read cache does not have that particular disk sector stored, it queries the disk drive for it;
3. the data is then transferred from the disk to the read cache. The host interface card is eavesdropping, so it simultaneously collects the data that is transferred from the disk to the read cache, thus saving the last step in the sequence.

It should be noted that existing firmware and algorithms from traditional copper bus backplane and crossbar devices may preferably be leveraged directly onto an optical crossbar backplane without modification. Furthermore, alterations to take advantage of these features (e.g. multicasting and eavesdropping) may preferably provide a more streamlined architectural processing sequence that may preferably result in a significant speed/throughput improvement.

It should be noted that the described embodiments offer many other benefits over the existing copper technology. For example, having many fewer electrical/mechanical connections (e.g. copper traces in intermittent contact with copper socket fingers) makes for a much more reliable device. Moreover, today's electronic devices are typically vulnerable to damage or destruction from Electro-Magnetic Pulses (EMP). The same theory that makes electrical transformers work (a magnetic field crossing a wire creates a voltage) also makes modem electronic devices susceptible to large magnetic pulses. Any magnetic pulse of sufficient intensity could conceivably destroy any device and its data. The absence of multiple parallel bus lines, as are typically found in a copper backplane (acting as a pulse receiving antenna), makes any device utilizing a passive optical crossbar backplane much more robust in this situation.

Figure 8:
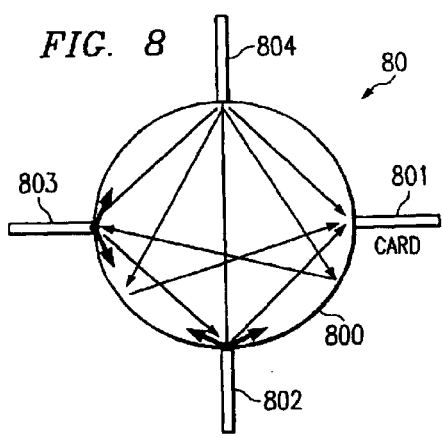
FIG. 8 is a diagram illustrating an additional embodiment configured in accordance with the teachings of representative embodiments configured in a wheel shape.

A significant benefit to representative embodiments is the flexibility of design that such an optical crossbar provides. An electronic system having an optical crossbar/backplane may preferably be constructed in a number of different configurations, such as a polygon or disk, or a three-dimensional configuration, such as a sphere, a cone, or a polyhedron. FIG. 8 is a diagram illustrating an additional embodiment configured in a wheel shape. System 80 comprises optical backplane 800, which is wheel shaped. Optical backplane 800 is preferably made from a similar translucent material as optical layer 700 (FIG. 7A). Plug-in cards 801–804 are arranged in a circular/spoke pattern around optical backplane 800. The "wheel" shape is highly expandable without the need for a replacement of either the backplane or existing cards.

Figure 9:
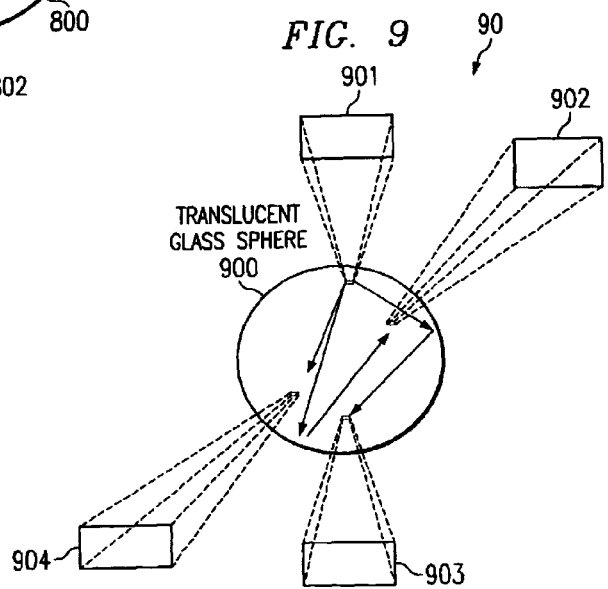
FIG. 9 is a diagram illustrating an additional embodiment configured in accordance with the teachings of representative embodiments configured in a spherical shape.

FIG. 9 is a diagram illustrating an additional embodiment configured in a spherical shape. A sphere allows a greater level of expandability that may practically be limited only by the number of discrete light frequencies available. Optical sphere 900 provides the transmission medium for the optical communication in spherical crossbar 90. Plug-in cards 901–904 may be designed in non-traditional, non-blade shapes such as the snub-nosed cone or pyramid illustrated in FIG. 9 for plug-in cards 901–904. Non-traditionally shaped plug-in cards may require wire-frame guides or the like to stabilize the configuration for allowing maximum expandability.

Figure 10:
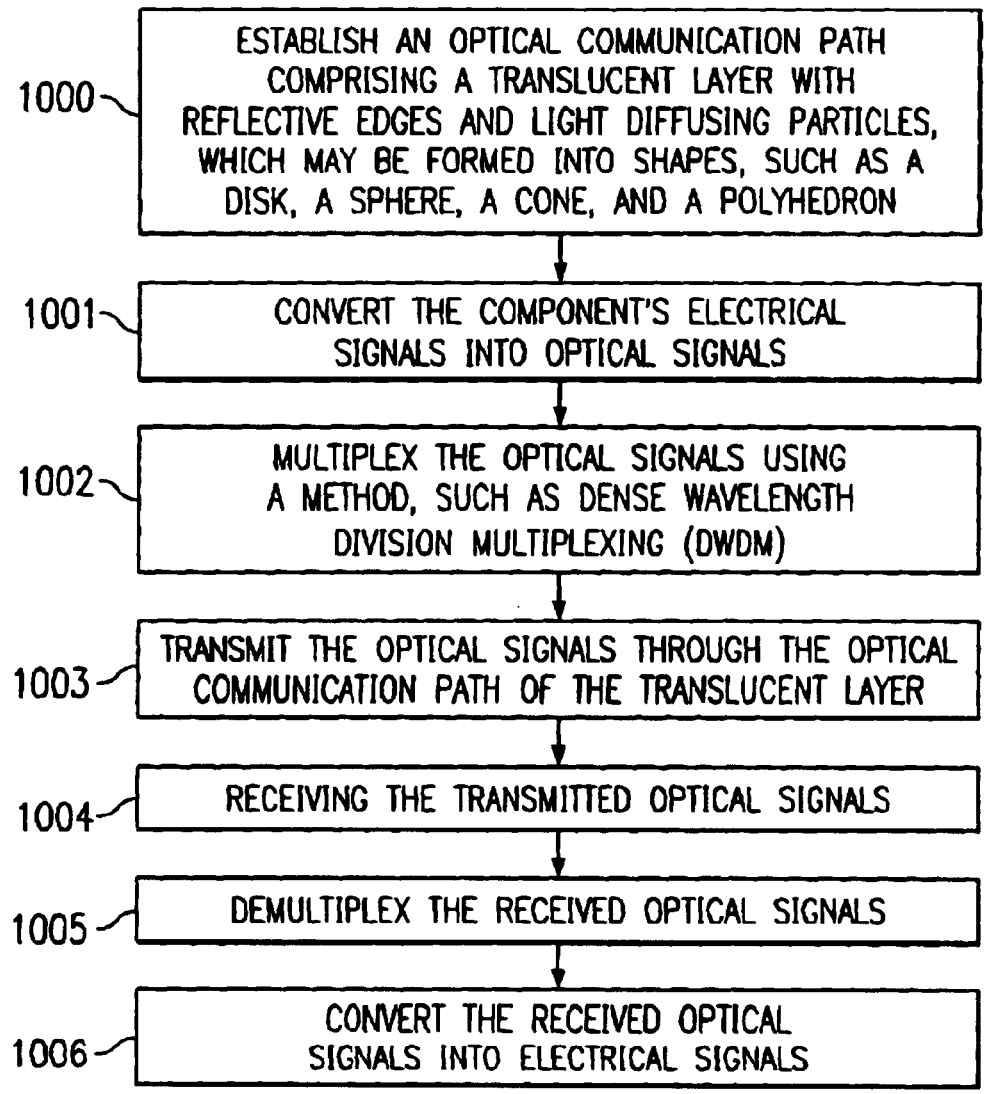
FIG. 10 is a flowchart illustrating steps in accordance with the teachings of representative embodiments.

FIG. 10 is a flowchart illustrating steps in accordance with the teachings of representative embodiments. In step 1000, an optical communication path is preferably established within a translucent layer having reflective edges and light diffusing particles, and which may also be formed into different shapes, such as a disk, a sphere, a cone, and a polyhedron. In step 1001 the component's electrical signals are converted into optical signals. The optical signals are then multiplexed using a method, such as Dense Wavelength Division Multiplexing (DWDM), in step 1002. In step 1003, the optical signals are transmitted through the optical communication path of the translucent layer. The transmitted optical signals are received in step 1004 and de-multiplexed in step 1005. In step 1006, the received optical signals are converted into electrical signals.

What is claimed is:

1. A system for interconnecting electronic components to facilitate shared communication comprising:
    a translucent optical layer;
    a plurality of access slots in said translucent optical layer providing access thereto; and
    at least one electronic component having:
        an optical communicator; and
        an optical interface connector, wherein said optical interface connector is complementarily matched to at least one of said access slots, and wherein said optical communicator accesses said translucent optical layer when each electronic component is inserted into one of said access slots.

2. The system of claim 1 wherein said translucent optical layer includes reflective edges.

3. The system of claim 2 wherein said translucent optical layer further includes light diffusing particles.

4. The system of claim 1 wherein said at least one electronic component communicates data using dense wavelength division multiplexing (DWDM).

5. The system of claim 4 wherein said optical communicator includes:

an optical multiplexing unit for multiplexing transmission signals into DWDM; and
    an optical de-multiplexing unit for de-multiplexing signals received in DWDM.

6. The system of claim 1 wherein said optical communicator comprises:
    an optical transmitter, wherein said optical transmitter transmits optical signals onto said optical translucent layer; and
    an optical receiver, wherein said optical receiver discriminates optical signals for processing by said at least one electronic component.

7. The system of claim 1 wherein said optical interface connector comprises
    optical light guides.

8. The system of claim 1 wherein said at least one electronic component includes:
    an electrical-to-optical converter, for converting electrical signals processed by said at least one electronic component into optical signals for transmission across said translucent optical layer; and
    an optical-to-electrical converter, for converting received optical signals into electrical signals for processing by said at least one electronic component.

9. The system of claim 1 wherein said translucent optical layer is formed in a shape of at least one of a disk, a sphere, a cone, and a polyhedron.

10. A method for optically connecting electronic components comprising:
    establishing an optical communication path, wherein said optical communication path comprises a translucent layer;
    transmitting optical signals through said optical communication path from at least one component, said at least one component accessing said optical communication path through at least one access opening in said translucent layer; and
    receiving optical signals transmitted through said optical communication path by said at least one component.

11. The method of claim 10 wherein said translucent layer includes at least one of reflective edges and light diffusing particles.

12. The method of claim 10 further comprising:
    multiplexing said optical signals prior to said transmitting step.

13. The method of claim 12 wherein said multiplexing comprises Dense Wavelength Division Multiplexing (DWDM).

14. The method of claim 10 further comprising:
    demultiplexing said optical signals after said receiving step.

15. The method of claim 10 further comprising:
    converting electrical signals on said at least one component into said optical signals for said transmitting step; and
    converting said optical signals received by said at least one component into electrical signals for processing on said at least one component.

16. The method of claim 10 wherein said translucent layer is formed into a shape of at least one of a disk, a sphere, a cone, and a polyhedron.

17. An optical switch comprising:
    means for providing an optical transmission medium common to at least one system element, wherein said optical transmission medium comprises a translucent optical layer;

means for transmitting optical communication signals through said optical transmission medium from the at least one system element, said at least one system element accessing said optical transmission medium through at least one slot in said translucent optical layer; and means for receiving optical communication signals transmitted through said optical transmission medium by said at least one system element.

18. The optical switch of claim 17 wherein said translucent optical layer includes at least one of:

means for reflecting said optical communication signals off of edges of said translucent optical layer; and means for diffusing light traveling through said translucent optical layer.

19. The optical switch of claim 17 further comprising:

means for multiplexing said optical signals prior to said means for transmitting; and means for demultiplexing said optical signals after said means for receiving.

20. The optical switch of claim 17 wherein each of said means for multiplexing and means for demultiplexing comprises Dense Wavelength Division Multiplexing (DWDM).

21. The optical switch of claim 17 further comprising:

means for converting electrical signals on said at least one system element into said optical signals for said means for transmitting; and means for converting said optical signals received by said at least one system element into electrical signals for processing on said at least one system element.

22. The optical switch of claim 17 wherein said translucent optical layer is formed into a shape of at least one of a disk, a sphere, a cone, and a polyhedron.

* * * * *